March 17, 1936.     G. R. GEHRANDT     2,034,093
CYLINDER SCAVENGING OF INTERNAL COMBUSTION ENGINES
Filed Nov. 1, 1933
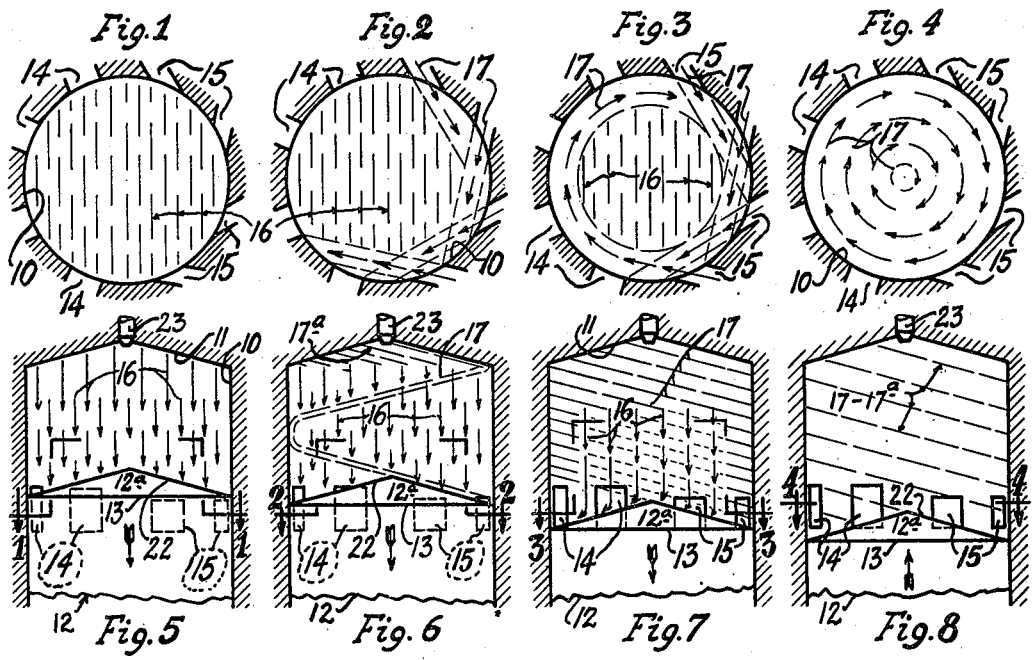
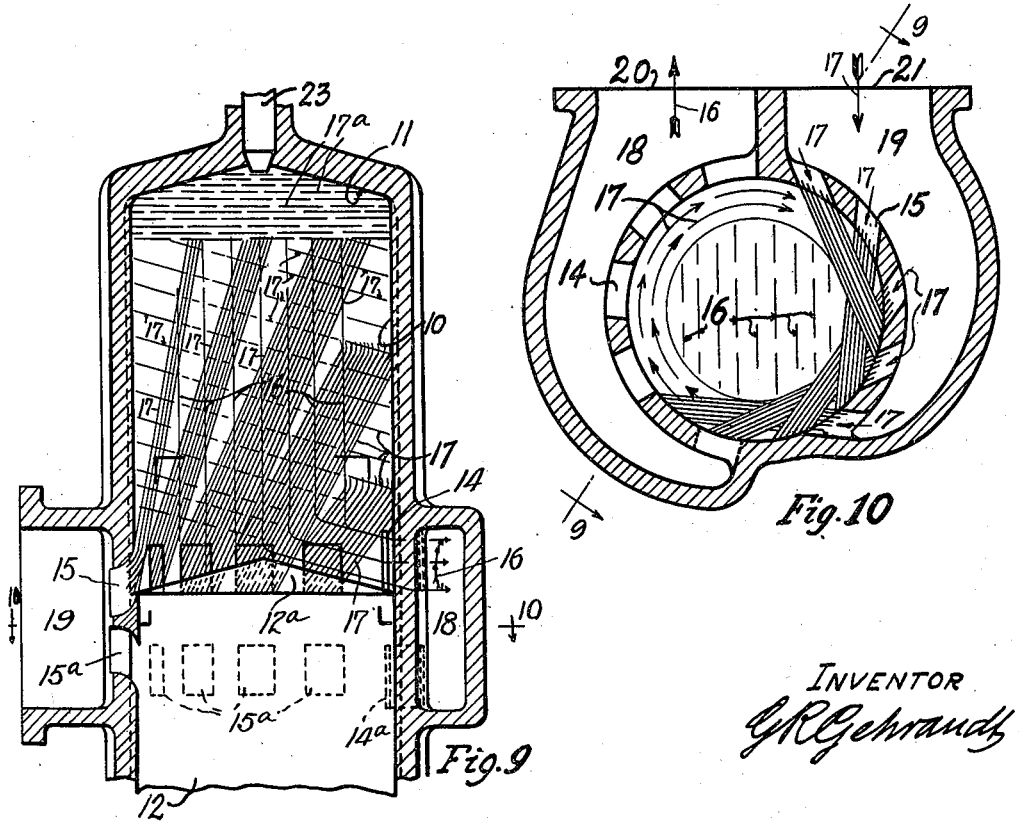
INVENTOR
G. R. Gehrandt Patented Mar. 17, 1936

2,034,093

UNITED STATES PATENT OFFICE 2,034,093

CYLINDER SCAVENGING OF INTERNAL COMBUSTION ENGINES

Gustav R. Gehrandt, Evanston, Ill.

Application November 1, 1933, Serial No. 696,161

15 Claims. (Cl. 123—65)

This invention relates to two-cycle, single and double acting internal combustion engines, and particularly to engines depending for the ignition of their fuel upon high compression temperatures of atmospheric air, or the type commonly known as Diesel engines.

In engines of this type, in order to increase their efficiency, it is of the utmost importance that the combustion gases after having performed their useful work upon the piston, be discharged into the manifold or the atmosphere in the most complete and rapid manner, but only a very short time is available for the complete emptying or scavenging of the cylinder of burnt gases and the refilling of the cylinder with fresh air.

While in the four-cycle engine a complete piston stroke is available each for the exhaust and refilling of the cylinder with fresh air or with gas and air mixture, in the two-cycle engine, the exhaust and refilling of the cylinder with fresh air or mixture must take place in a fraction of a piston stroke shortly before and after the passing of the dead center of the crank.

It is one of the objects of the present invention to provide ports or slots which are controlled by the outer edge of the piston in a single acting engine, and both the outer and inner piston edges in double acting engines.

For the purposes of illustration the invention is described in connection with a vertical engine, although it is to be understood that it can be employed in connection with horizontal, inclined or moving cylinders.

The pressure of the fresh air entering the cylinder in this invention is preferably controlled by a pump (not shown).

It is another object of the invention to provide a method and arrangement of piston controlled slots which facilitates and concentrates the most rapid expulsion of the exhaust gases from the cylinder, and allows at the same time a quick recharging of the cylinder with fresh air.

Another object of the invention is the concentration of the exhaust gases during their exit away from the cylinder walls towards the center thereof, and the forcing of the burnt gases through the piston controlled slots without interfering or intermingling with the incoming fresh air.

Another object of the invention is the arrangement of the air inlet slots in such a manner that the fresh air will move in a spiral along the cylinder wall, thereby thoroughly cleaning and cooling the wall.

A further object is the forming of a fresh air cushion between the cylinder head and the exhaust gas layer nearest the cylinder head and thereby effectively assisting in the quick expulsion of the exhaust gases.

Another object of this invention is the arrangement of the air inlet slots in such a manner that the incoming air streams are overlapping or straddling each other in order to secure the most possible intimate hugging of the air streams with cylinder wall.

A further object is the provision of turbulence caused by the circular, spiral movement of the incoming air streams, and which spiral movement will (due to inertia thereof) continue after the air slots are closed by the piston, and while the air is being compressed by the piston, so that when fuel is injected into the cylinder the fuel jets will be continuously and forcefully struck by the circulating fresh air, thereby most efficiently assisting the process of combustion, as the fuel molecules are brought continuously in touch with the oxygen atoms of the circulating air.

A further object of the invention is to preserve the body and outlines of the exhaust gas stream and the incoming streams of fresh air, i. e., to prevent an intermingling of exhaust gases and fresh air.

The efficiency of the scavenging and refilling process depends to a great extent on the compactness of the exhaust gases and air.

Another object of the invention is to simplify the design of air and exhaust manifolds by arranging and locating both exhaust and air inlets on one side of the engine cylinder, leaving the other side entirely free for other apparatus, such as oil pumps, control apparatus, etc.

A still further object of the invention is to simplify the design of the cylinder castings, manifold arrangement, control apparatus, etc., thereby reducing the cost of manufacture and increasing the output and efficiency of the engine.

Other and further objects and advantages will be apparent from the specification taken in connection with the accompanying drawing, in which latter:

Figure 1 is an irregular, horizontal, sectional view taken on line 1—1, Figure 5.

Figure 2 is an irregular, horizontal, sectional view taken on line 2—2, Figure 6.

Figure 3 is an irregular, horizontal, sectional view taken on line 3—3, Figure 7.

Figure 4 is a horizontal sectional view taken on line 4—4, Figure 8.

Figure 5 is a diagrammatic illustration of a portion of an engine cylinder and piston, showing the exhaust ports partially opened and the inlet ports closed.

Figure 6 is a view similar to Figure 5 with a larger area of exhaust outlets open, and with the inlet ports partially open.

Figure 7 is a view similar to Figure 6, with a larger area of air inlet and exhaust ports open.

Figure 8 is a view similar to Figure 7, illustrating the piston at the time that it is beginning to move in a direction to close the inlet and exhaust ports.

Figure 9 is a vertical sectional view of one end of a double acting type of engine, constructed in accordance with the principles of this invention, and on a larger scale.

Figure 10 is a horizontal sectional view taken on line 10—10, Figure 9.

Referring more particularly to the drawing the numeral 10 designates the cylinder wall, 11 the cylinder head and 12 a piston having a conical extremity 12a to provide an edge 13.

The numeral 14 designates exhaust slots or ports arranged around a portion of the cylinder and are spaced from the adjacent head of the cylinder. These ports may be of any desired size and configuration, and are adapted to be controlled, that is opened and closed by reason of the edge 13 of the piston 12.

These ports may be radially disposed and any desired number thereof may be employed.

The numeral 15 designates air slots or ports which are arranged on the side of the cylinder opposite the side on which the slots 14 are arranged, and these air slots 15 receive air under pressure from any suitable source, not shown, to be directed into the cylinder. The exhaust gas streams 16 will, when the ports 14 are open, escape through the latter and the air, indicated by the arrow 17, will be delivered into the cylinder to force the burnt gases 16 out through the outlet ports 14.

The ports 15 are so arranged that the air currents 17 flowing into the cylinder will be discharged thereinto at tangents to the cylinder wall in clearly defined zones or paths, and these paths or zones are also so arranged that they will, so to speak, overlap or straddle each other. This is also accomplished by reason of the fact that the zones or paths of the incoming air are arranged at different angles of inclination with respect to each other, so that the air being discharged from the outlets of the ports 15 will enter the cylinder in zones which are spaced in directions lengthwise of the cylinder, as shown more clearly in Figures 2, 3 and 10, in order to cause the air currents to hug the cylinder wall, and at the same time cause the air currents to flow around the cylinder wall and about the exhaust gas zone 16.

As the air currents 17 are admitted into the cylinder at tangents to the wall thereof and in clearly defined zones or paths, they will strike the conical surface 22 of the end 12a of the piston which surface will assist to deflect the air streams upwardly as indicated in Figure 6, still maintaining their own separate zone or path, so that they will flow spirally over the cylinder wall and about the column of exhaust gas 16 to the top of the cylinder where they will then commingle and form a united air cushion, indicated at 17a in Figure 6 at the end of the column of air and gas. This air cushion will increase in thickness as shown at 17a, in Figure 7, and as the exhaust gas 16 will be surrounded by air streams 17, with the air cushion 17a at the end of the column or zone of exhaust gas, the exhaust gas will be confined within a sheath or casing of air streams. The air streams, as the cushion 17a increases, will operate to force the exhaust gas out of the exhaust ports 14, as indicated in Figure 7.

By the time the piston 12 starts to ascend from the position shown in Figure 8, all of the gas streams 16 will have been scavenged from the cylinder, and the cylinder beyond the piston end will be filled with the air streams 17—17a so that upon a further movement of the piston 12 in the same direction the air streams 17—17a will be compressed, resulting in a high temperature into which fuel from the nozzle 23 will be injected to be ignited.

Due to the position or arrangement of the air inlet slots 15 the air will be given a turbulence and due to the inertia thereof such turbulence or circular, spiral movement will continue after the air inlet slots are closed by the piston and while the air is being compressed by the piston, so that when fuel is injected through the fuel nozzle 23 into the cylinder, the fuel jets will be continuously and forcefully struck by the circulating fresh air, with the result that there will be an effective assistance in the process of combustion as the molecules will be brought continuously in contact with the oxygen atoms of the circulating air.

At the same time it will be manifest that the exhaust gas streams will be confined in a zone encompassed by the circulating air streams and an intermingling of the exhaust gases and the fresh air will be prevented.

The numeral 20 designates an exhaust exit, with which the slots or ports 14 have communication, and the numeral 21 designates an air inlet chamber or passage, which has communication with the air inlet slots or ports 15, and it will be noted that the open ends of the exhaust chamber 20 and the inlet chamber or passage 21 are located on the same side of the engine cylinder, with the result that the other side of the cylinder will be free for other apparatus, such as oil pumps, control apparatus, etc., thereby resulting in a structure which will be of a very compact nature, and at the same time will be of a comparatively light construction.

In Figure 9 there is illustrated a double action engine, and it is to be understood that this engine operates at each end in a manner similar to the forms of the invention shown in Figures 1 to 8.

It is thought that the operation of this improved construction will be clearly understood from the foregoing, but briefly stated it is as follows.

Referring to Figures 1 and 5, the piston 12 is moving downwardly and is just opening the exhaust slots 14. This will cause a reduction of the gas pressure in the cylinder to the manifold or atmosphere, and during this portion of the stroke of the piston 12 the air inlet slots are still closed.

In Figures 2 and 6 the piston is still moving downwardly continuing to further open the exhaust ports 14, while the air slots 15 are just beginning to open. Due to the tangential arrangement of the air ports 15, the air streams 17 are forced towards the cylinder wall and rise spirally to the top of the cylinder or cylinder head 11 and form there a cushion resting against the end of the cylinder and the end of the column or zone of exhaust gases.

In Figures 3 and 7 the piston 12 is still moving downwardly and has now completely opened the exhaust slots 14 and the air slots 15. The spirally ascending air streams 17 forming now a substantial cushion on top of the outgoing exhaust gases, which cushion is continuously increased in thickness, due to the incoming air ascending spirally in a substantially annular form between the exhaust gases and the cylinder wall. The cylinder walls are therefore protected against the heat of the exhaust gases and are cooled at the same time, as the incoming air is considerably colder than the exhaust gases. This will facilitate lubrication of the cylinder walls. The air cushion on top of the exhaust gases continues to increase in thickness until the cylinder is completely emptied of the exhaust gases and entirely filled with fresh air, as shown in Figure 8.

It is customary to provide an exhaust valve (not shown) in the exhaust line, which will be closed at the time that the cylinder has been exhausted of burnt gases, so that no fresh air will be forced through the exhaust slots 14.

In Figures 4 and 8, the piston has reached its lower dead center and is beginning now to move upwardly to compress the fresh air. The exhaust pipe is being closed at this time by means of the valve (not shown). Due to the inertia of the spirally rotating fresh air this movement of the air will continue even after being fully compressed, with the result that the incoming fuel jets, when the piston is moving nearer its upper dead center, will be continuously contacted by fresh layers of air when the fuel is injected into the highly compressed and consequently extremely hot air in the cylinder and thereby accelerate a complete combustion.

In Figures 9 and 10, the piston 12 is moving downwardly and has fully opened the exhaust slots 14 and the air slots 15. The action of the gases and the air in this form of the invention is the same as that described in connection with Figures 3 and 7. In this form of the invention a second series of exhaust slots 14ª and air inlet slots 15ª are provided and are controlled by the other edge of the piston 12.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. A two-cycle engine of the character described, comprising a cylinder, exhaust ports, a piston reciprocable in the cylinder for controlling said ports, air ports for directing air currents into the cylinder in clearly defined and separate zones or paths in different planes with respect to the length of the cylinder and out of commingling relation with each other, and means co-operating with the air ports for causing air in such zones or paths to flow in a circular path around and in contact with the cylinder wall and spirally in a direction lengthwise of the axis of the cylinder to the end thereof, to encase the burnt gases in a shell of air out of commingling relation therewith, the air acting to force the burnt gases out the exhaust ports.

2. A two-cycle engine of the character described, comprising a cylinder, exhaust ports, a piston reciprocable in the cylinder for controlling said ports, air ports for directing air currents into the cylinder in clearly defined and separate zones or paths in different planes with respect to the length of the cylinder, out of commingling relation with each other, means cooperating with the air ports for causing air to flow in a circular path around and in contact with the cylinder wall and spirally in a direction lengthwise of the axis of the cylinder to the end thereof when such air currents commingle, to encase the burnt gases in a shell of air out of commingling relation therewith, the air acting to force the burnt gases out the exhaust ports, the air being compressed by the movement of the piston while the turbulence of the air continues, and means whereby a fuel may be injected into the compressed turbulent air.

3. A two cycle engine of the character described, comprising a cylinder, exhaust ports, air inlet ports, a piston reciprocable in the cylinder for controlling the ports, said air ports being disposed on different angles of inclination with respect to each other in directions lengthwise of the cylinder, whereby the air currents will be admitted through the inlet ports into the cylinder in a manner to force the burnt gases away from the cylinder walls towards the center of the cylinder and out through the exhaust ports, while the air and burnt gases are maintained out of commingling relation, and the air currents will be maintained in clearly defined zones or paths in different planes with respect to the length of the cylinder, out of commingling relation with each other until they commingle beyond the end of the burnt gas column.

4. A two cycle engine of the character described, comprising a cylinder, exhaust ports, air inlet ports, a piston reciprocable in the cylinder for controlling the ports, said air ports being disposed on different angles of inclination with respect to each other in directions lengthwise of the cylinder, whereby the air currents will be admitted through the inlet ports into the cylinder in a manner to force the burnt gases away from the cylinder walls towards the center of the cylinder and out through the exhaust ports, while the air and burnt gases are maintained out of commingling relation and the air currents will be maintained in clearly defined zones or paths in different planes with respect to the length of the cylinder, out of commingling relation with each other until they meet beyond the end of the burnt gas zone, the turbulence of the air continuing during compression of the air by said piston.

5. A two cycle engine of the character described comprising a cylinder, exhaust ports, air inlet ports, and a reciprocable piston for controlling said ports, said air ports being arranged tangentially with respect to an imaginary circle concentric to the axis of the cylinder and spaced from the cylinder wall and disposed at different angles of inclination in directions lengthwise of the cylinder for admitting air rotatively into the cylinder to flow spirally along the cylinder wall towards the end of the cylinder in clearly defined and separate zones or paths in different planes with respect to the length of the cylinder to encompass the burnt gases in the cylinder, out of commingling relation with each other until they meet at the end of the burnt gas zone, and out of commingling relation with the burnt gases to force the latter through said exhaust ports.

6. A two-cycle engine of the character described, comprising a cylinder, exhaust ports, air inlet ports, and a reciprocable piston for controlling said ports, said air ports being arranged tangentially with respect to an imaginary circle concentric to the axis of the cylinder and spaced from the cylinder wall for admitting air rotatively into the cylinder, said air ports being also disposed at different angles of inclination with respect to each other in directions lengthwise of the cylinder to cause the air to flow spirally along the cylinder wall towards the end of the cylinder in clearly defined and separate zones or paths in different planes with respect to the length of the cylinder, to encompass the burnt gases in the cylinder, out of commingling relation with each other until they reach the end of the cylinder and out of commingling relation with the burnt gases to force the latter through said exhaust ports.

7. A two-cycle engine of the character described, comprising a cylinder, exhaust ports and air inlet ports at one end of the cylinder, and a reciprocable piston for controlling said ports, said air ports being arranged tangentially with respect to an imaginary circle concentric to the axis of the cylinder and spaced from the cylinder wall for admitting air rotatably into the cylinder, said air ports being also disposed at different angles of inclination with respect to each other in directions lengthwise of the cylinder to cause the air to flow spirally along the cylinder wall toward the other end of the cylinder in clearly defined and separate zones or paths in different planes with respect to the length of the cylinder to the end of the cylinder, to form a cushion between such end and the burnt gases and to encompass the burnt gases in the cylinder, out of commingling relation with each other until they meet beyond the end of the burnt gas column, and out of commingling relation with the burnt gases to force the latter out through said exhaust ports.

8. A two-cycle engine of the character described comprising a cylinder, exhaust ports, air inlet ports, and a reciprocable piston for controlling said ports, said air ports being arranged tangentially with respect to an imaginary circle concentric with the axis of the cylinder and spaced from the cylinder wall for admitting air rotatively into the cylinder, said air ports being also disposed at different angles of inclination with respect to each other in directions lengthwise of the cylinder to cause the air to flow spirally along the cylinder wall in clearly defined and separate zones or paths in different planes with respect to the length of the cylinder toward the end of the cylinder to encompass the burnt gases in the cylinder, out of commingling relation with each other until they meet beyond the end of the burnt gas area, and force the burnt gases out through said exhaust ports, the tangentially admitted air zones or paths overlapping each other, to insure an intimate hugging of the separate air streams with the cylinder wall.

9. A two-cycle engine of the character described, comprising a cylinder, exhaust ports and air inlet ports at one end of the cylinder, and a reciprocable piston in the cylinder for controlling said ports, said air inlet ports being so arranged as to admit air streams tangentially into the cylinder to produce a rotative flow of the air streams and also disposed at different angles of inclination with respect to each other in directions lengthwise of the cylinder to cause the air to flow in clearly defined zones or paths in different planes with respect to the length of the cylinder and across the cylinder wall, and means within the cylinder to assist in causing the air currents to flow spirally toward the end of the cylinder, the air currents co-operating with the other end of the cylinder to form an encasing shell about and out of commingling relation with the burnt gases in the cylinder, the thickness of the encasing shell increasing with the admission of air to force the burnt gases out of the cylinder.

10. A two-cycle engine of the character described, comprising a cylinder, exhaust ports, air inlet ports, a reciprocable piston in the cylinder for controlling said ports, said air inlet ports being so arranged as to admit air streams tangentially into the cylinder to produce a rotative flow of the air streams, said air ports being also arranged at different angles of inclination with respect to each other in directions lengthwise of the cylinder to also cause air to flow in clearly defined or separate zones in different planes with respect to the length of the cylinder and across the cylinder wall, means within the cylinder to assist in causing the air currents to flow spirally towards the end of the cylinder out of commingling relation with each other until they meet beyond the burnt gas zone, the air currents co-operating with the piston end to form an encasing shell about and out of commingling relation with the burnt gases in the cylinder, the thickness of the encasing shell increasing with the admission of air to force the burnt gases out of the cylinder, the turbulence of the air continuing during compression thereof and while fuel is being injected thereinto, and means whereby fuel may be injected.

11. A two-cycle engine of the character described, comprising a cylinder, exhaust ports, air inlet ports in the cylinder wall, a piston reciprocable in the cylinder for controlling the ports, said air inlet ports being so arranged as to admit air streams tangentially into the cylinder and also arranged at different angles of inclination to produce flow of the air streams in clearly defined and separate zones or paths in different planes with respect to the length of the cylinder and in a spiral course over the cylinder wall towards the end of the cylinder where they meet so as to operate to force the burnt gases away from the cylinder walls towards the center of the cylinder and out through the exhaust ports, while the air currents are maintained out of commingling relation with each other and with the burnt gases, the turbulence of the air continuing during compression of the air by said piston.

12. In the operation of an engine of the character described, the method which comprises introducing a charge of air in clearly defined and separate zones or paths contacting with the cylinder wall on the opposite side of the axis of the cylinder and spaced in directions lengthwise of the cylinder and in a circular and spiral course across the cylinder wall towards the end of the cylinder to encompass the gases, out of commingling relation with each other until they meet beyond the burnt gas zone, and out of commingling relation with such burnt gases to force the burnt gases out of the cylinder.

13. In the operation of an engine of the character described, the method which comprises introducing a charge of air in clearly defined and separate zones or paths contacting with the cylinder wall on the opposite side of the axis of the cylinder and spaced in directions lengthwise of the cylinder, and in a circular and spiral course across the cylinder wall towards the end of the cylinder to encompass the gases, out of commingling relation with each other, until they meet beyond the burnt gas zone, and out of commingling relation with such burnt gases to force the burnt gases out of the cylinder, compressing the air while turbulent and injecting fuel into the turbulent body of compressed air.

14. In the operation of an engine of the character described, the method which comprises introducing a charge of air in clearly defined zones or paths contacting with the cylinder wall on opposite sides of the axis of the cylinder and spaced in directions lengthwise of the cylinder and in a circular course over the wall of the cylinder, out of commingling relation with each other until they meet at one end of the burnt gas zone, to form a shell of air between the cylinder wall and the zone of burnt gas, and also a cushion of air between the cylinder end and the burnt gases to force the latter out of the cylinder by increasing the thickness of the air shell and cushion.

15. In the operation of an engine of the character described, the method which comprises introducing a charge of air in clearly defined zones or paths contacting with the cylinder wall on the opposite side of the axis of the cylinder and spaced in directions lengthwise of the cylinder and in a circular course over the wall of the cylinder, out of commingling relation with each other, until they meet beyond the end of the burnt gas zone to form a shell of air between the cylinder wall and the zone of burnt gases, and also a cushion of air between the cylinder end and the burnt gases out of commingling relation with such gases, to force the latter out of the cylinder by increasing the thickness of the air shell and cushion, to fill the cylinder with turbulent air, then compressing the turbulent air, and then injecting fuel into the compressed and turbulent air.

GUSTAV R. GEHRANDT.